J. Taggart,
Stone-Channeling Machine.

Nº 13,896.                    Patented Dec. 4, 1855.

UNITED STATES PATENT OFFICE.

JOHN TAGGART, OF ROXBURY, MASSACHUSETTS, ASSIGNOR TO HIMSELF AND VERNON BROWN.

MACHINE FOR CHANNELING STONE.

Specification forming part of Letters Patent No. 13,896, dated December 4, 1855; Reissued June 5, 1866, No. 2,278.

*To all whom it may concern:*

Be it known that I, JOHN TAGGART, of Roxbury, in the county of Norfolk and State of Massachusetts, have invented a new and useful Machine for Drilling in Straight Lines Through a Block of Stone; and I do hereby declare that the same is fully described and represented in the following specification and the accompanying drawings, of which—

Figure 4:
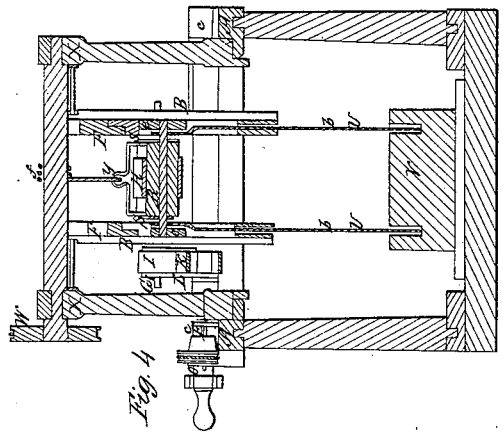
Figure 3:
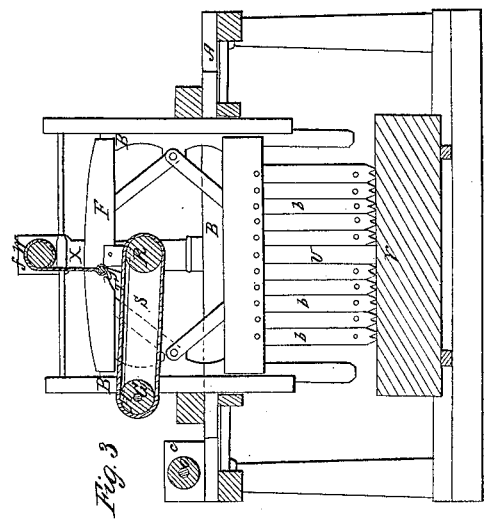
Figure 1:
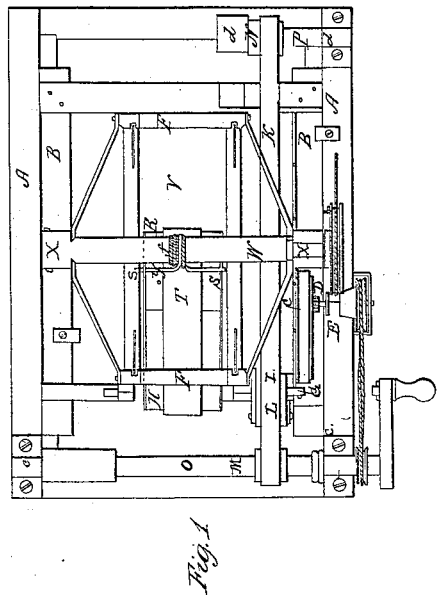
Figure 2:
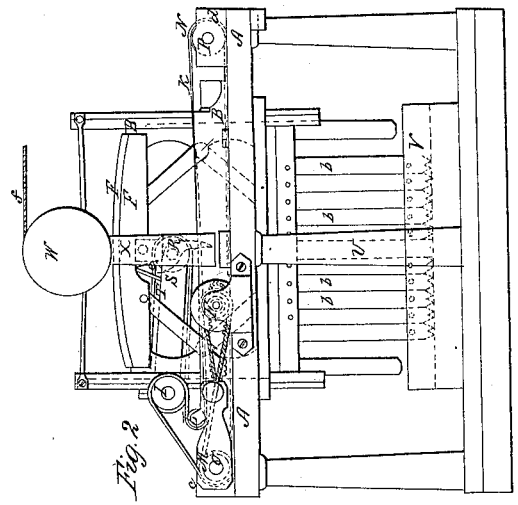

Figure 1, denotes a top view of such machine; Fig. 2, a side elevation of it; Fig. 3, a vertical, central and longitudinal section of it; Fig. 4, a transverse section of it.

In these drawings, A, exhibits a frame which supports a movable carriage B, which is so adapted to it as to be capable of being moved rectilinearly upon it, either forward or backward, it having a reciprocating motion imparted to it by means of an endless elongated internal gear C, (applied to its side) and a pinion D, affixed to a vibrating shaft E, such mechanism being well known for the purpose of producing reciprocating rectilinear motion. I do not confine my invention to the use of such, as any other of a suitable kind and for a similar purpose may be substituted.

The sliding carriage B, sustains two or more saw or drill gates, F, F, each of which is made to play or move vertically within guides or posts *a a*. Each of these gates or frames F, F, carries a series of saws or long drills *b, b, b*, arranged in one plane as seen in the drawings. On one end of the carriage B, there is fixed a horizontal shaft G, which supports two pulleys or drums H, I, arranged as seen in Figs. 1, and 2, an endless band K, being made to extend around the pulley I, and three pulleys L, M, N, disposed as seen in said figures. The first of the last three pulleys is supported by the carriage B, while the remainder of them are respectively carried by shafts O, P, that are sustained by and made to revolve in boxes *c, c*, and *d, d*, arranged as seen in the drawings and particularly in Figs. 1 and 2 thereof. The shaft O, is the "driving" shaft of the machine and by means of the above described mechanism, connecting it with the shaft G, it serves to put and maintain the latter in revolution during the rectilinear movements of the carriage B.

Around the drum H, before described, and another drum R, (supported by a frame S, which should rock or turn freely in a vertical direction upon the shaft G,) an endless band, T, is made to work so as to transfer motion from the drum H to the drum R, upon whose shaft there is affixed directly under each saw or drill gate, a set of lifter cams or wipers *e, e*.

The frame S, besides being supported at one end upon the shaft G is sustained at its other by means of standards or posts, U, U, which extend downward from the shaft of its drum R, and respectively rest on the bottom of the grooves formed in the stone V, by the drills or saws. Each saw or drill gate is elevated by the action of its wipers and allowed to fall downward toward the stone by the power of gravity.

From the above it will be seen that if the saw gates have a quick vertical motion imparted to them, while they are moved horizontally by and with their carriage B, the drills of each will be made to cut the stone in a straight line, path or groove. It will also be seen that as the mechanism for elevating the saw gates is supported by standards or posts extending down therefrom and into the said grooves and resting on the bottoms thereof, the said operating mechanism will be caused to descend in proportion to the descent of the drills into the stone.

In order to elevate all the drills simultaneously out of the grooves in the stone, I make use of a windless, W, which may be supported on posts, X, X, extended upward from the carriage B, the cord *f*, of the windlass barrel being connected to a bale Y, projecting upward from the frame, S.

A machine constructed in manner as above described, will be found very useful for the purpose for which it is intended.

What I claim therein is—

Supporting the operative machinery of the drill saws by means of standards, U, U, extending down therefrom and resting upon the bottom of the grooves made in the stone by said drills, the same enabling said operative parts or machinery to move downward with the drills in proportion as they may cut into the stone.

In testimony whereof, I have hereunto set my signature this twenty-ninth day of September A. D. 1855.

JOHN TAGGART.

Witnesses:
R. H. EDDY,
F. P. HALE, Jr.

[FIRST PRINTED 1912.]